US008963738B2

(12) United States Patent
Myler (10) Patent No.: US 8,963,738 B2
(45) Date of Patent: *Feb. 24, 2015

(54) VEHICLE INFORMATION SYSTEMS AND METHODS

(71) Applicant: Lamar University, Beaumont, TX (US)

(72) Inventor: Harley Ross Myler, Beaumont, TX (US)

(73) Assignee: Lamar University, Beaumont, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,345

(22) Filed: Oct. 11, 2013

(65) Prior Publication Data

US 2014/0035739 A1 Feb. 6, 2014

Related U.S. Application Data

(63) Continuation-in-part of application No. 12/958,197, filed on Dec. 1, 2010, now Pat. No. 8,581,744.

(60) Provisional application No. 61/323,712, filed on Apr. 13, 2010.

(51) Int. Cl.
*G08G 1/00* (2006.01)
*B60Q 1/50* (2006.01)
*G08G 1/0965* (2006.01)

(52) U.S. Cl.
CPC ................ *B60Q 1/50* (2013.01); *G08G 1/0965* (2013.01)

USPC ...... 340/902; 340/901; 340/905; 340/995.13; 340/425.5

(58) Field of Classification Search
None
See application file for complete search history.

(56) References Cited

U.S. PATENT DOCUMENTS

| | | | |
|---|---|---|---|
| 5,497,148 A | 3/1996 | Oliva | |
| 5,594,432 A | 1/1997 | Oliva et al. | |
| 5,612,685 A | 3/1997 | Oliva | |
| 5,933,093 A | 8/1999 | Austin, II | |
| 6,121,880 A * | 9/2000 | Scott et al. | 340/572.5 |
| 6,236,336 B1 | 5/2001 | Oliva et al. | |
| 6,359,570 B1 * | 3/2002 | Adcox et al. | 340/902 |
| 6,501,387 B2 * | 12/2002 | Skiver et al. | 340/815.4 |
| 8,258,979 B2 * | 9/2012 | Lemmons et al. | 340/901 |
| 8,581,744 B2 * | 11/2013 | Myler | 340/902 |
| 2002/0080021 A1 * | 6/2002 | Skiver et al. | 340/438 |
| 2005/0110629 A1 * | 5/2005 | Williams | 340/463 |
| 2012/0089273 A1 * | 4/2012 | Seder et al. | 701/2 |

* cited by examiner

Primary Examiner — Travis Hunnings (57) ABSTRACT

An alert apparatus and related systems. The alert apparatus includes a controller and a wireless receiver connected to the controller and configured to receive data from a transmitter. The alert apparatus includes a packaging containing the controller and receiver and a visual indicator connected to be controlled by the controller and visible from outside of a vehicle on which the alert apparatus is mounted. The visual indicator is controllably activated by the controller based on the received data, and the alert apparatus is mounted on a windshield of the vehicle.

18 Claims, 5 Drawing Sheets

VEHICLE INFORMATION SYSTEMS AND METHODS

CROSS-REFERENCE TO OTHER APPLICATION

This application is a continuation-in-part of U.S. patent application Ser. No. 12/958,197, filed Dec. 1, 2010, and claims priority from U.S. Provisional Patent Application 61/323,712, filed Apr. 13, 2010, both of which are hereby incorporated by reference.

TECHNICAL FIELD

The present disclosure is directed, in general, to vehicle information and warning systems.

BACKGROUND OF THE DISCLOSURE

Efficient means for providing information to drivers or about vehicles are desirable.

SUMMARY OF THE DISCLOSURE

Various embodiments include an alert apparatus and related systems. The alert apparatus includes a controller and a wireless receiver connected to the controller and configured to receive data from a transmitter. The alert apparatus includes a packaging containing the controller and receiver and a visual indicator connected to be controlled by the controller and visible from outside of a vehicle on which the alert apparatus is mounted. The visual indicator is controllably activated by the controller based on the received data, and the alert apparatus is mounted on a windshield of the vehicle.

Some embodiments include an alert system having a driver alert apparatus mounted on a vehicle and having a controller, a wireless receiver connected to the controller, a packaging containing the controller and receiver, and a visual indicator connected to be controlled by the controller. The system has a transmitter apparatus configured to transmit data to the driver alert apparatus to query a vehicle status of the vehicle. The wireless received is configured to receive the data, and the visual indicator is controllably activated by the controller based on the received data and the vehicle status.

Various embodiments can include various other features. For example, the transmitter apparatus can be a handheld device or can be stationary. The visual indicator can be controllably activated by the controller based both on the received data and on a vehicle status. The vehicle status can be one of status of a vehicle registration, status of a vehicle inspection, a commercial load inspection status, or a commercial load weighing status. The data can include a command to query the vehicle status. The vehicle status can a vehicle registration and the visual indicator can be activated either when the vehicle registration is expired or when the vehicle registration is valid. The visual indicator, when activated, can be visible at a distance of at least 20 yards in some cases, and can be a plurality of individually-controllable light-emitting diodes. The packaging can be attached to a state-issued vehicle sticker, and the apparatus can include at least one solar cell that is visible through a transparent portion of the packaging. A rechargeable battery can be connected to power the controller and to be charged by the at least one solar cell. The controller can be configured to update a vehicle status in response to the received data.

As other examples, the apparatus can include at least one solar cell that is visible through a transparent portion of the packaging, and the alert apparatus can be configured to be mounted on a window of a vehicle such that the solar cell is exposed to light through the window. The visual indicator can be at least one strobe light-emitting diode, and can be also visible to a driver of the vehicle.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments relate to a system that includes a vehicle alert apparatus for notifications to the driver or other persons, as well as related transmitters, systems, and methods. Disclosed embodiments include a plurality of transmitter apparatus units carried by law enforcement or emergency personnel, such as firefighters or paramedics, for the purpose of alerting drivers to emergency conditions where caution is warranted. Drivers or the persons are then alerted by the visual and audible response of an alert apparatus located in their vehicles that emits an audible and/or visual alarm when emergency situations are in effect. Disclosed embodiments also include a vehicle-mounted alert apparatus that responds to detecting a transmission by activating a visual alarm or indicator that is visible outside the vehicle. The "alert" can include any visual or audible signal that provides information, in response to the transmission, to persons inside or outside of the vehicle.

Situations can include, but are not limited to, emergency vehicle egress and avoidance of civilian vehicles, law enforcement activities such as where police have stopped a motorist, are in pursuit, or are supervising a road hazard or condition, and any cautionary conditions where motorists need to be alerted by authorities to slow down, proceed with caution or stop. Another situation is when a transmitter is used to activate the vehicle-mounted alert apparatus so that the response of the alert apparatus can be seen from outside the vehicle. For example, a law enforcement officer can use the transmitter to activate the vehicle-mounted alert apparatus, and the vehicle-mounted apparatus produces a visible response that can indicate, for example, the registration or inspection status of the vehicle.

Some embodiments include an alert apparatus that is mounted to the windshield of the privately operated or commercial vehicle, preferentially on the driver's side in the lower corner. Other mounting schemes are understood, such as under the rear view mirror, on a non-moving side window, or on the back window.

Figure 1:
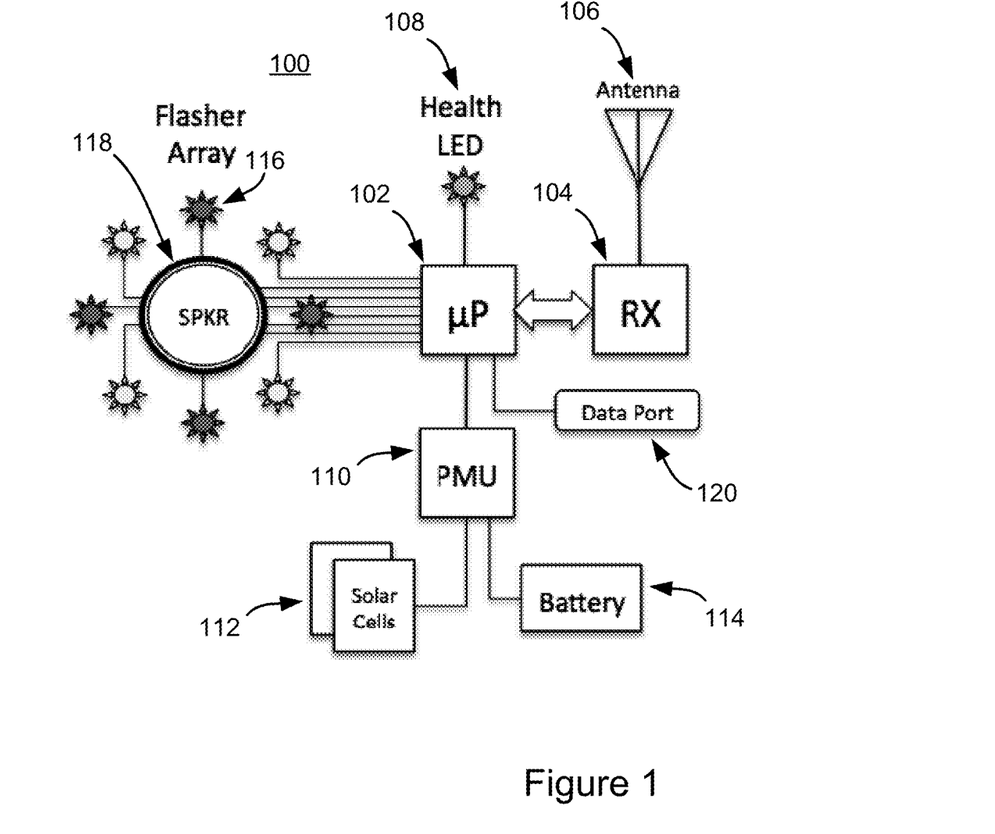
FIG. 1 depicts a functional block diagram of an alert apparatus in accordance with disclosed embodiments.

FIG. 1 depicts a functional block diagram of an alert apparatus 100 in accordance with disclosed embodiments that acts to receive wireless signals and alert a driver as disclosed herein.

The various components illustrated here can be physically implemented, for example, by mounting on a printed circuit board (PCB), and as otherwise described herein. The PCB in some embodiments, can be a flexible substrate, and is preferably thin with a shallow bend radius. The form factor of the entire mounted alert apparatus 100 is preferably able to fit within a 4"×2.5" rectangle, and is encapsulated in a flexible clear epoxy.

The operations of alert apparatus 100 are controlled by a controller 102. Controller 102 includes an accessible memory, either integral or separate but connected to be read from and written to by the controller 102, that can store information related to the vehicle status as described herein. The controller can, in some embodiments, be implemented as a microprocessor or otherwise as will be understood by those of skill in the art. The controller 102 can preferably operate in a low-power mode, and can cause the alert apparatus to perform such functions as described herein, including decoding received signals, outputting a visual alert, outputting an audible alert, transmitting and receiving data via a data port, and others. The controller 102 can interface with the power management unit described below, and can monitor its own health. When degrading or losing power, preferably the audible alerts can be shut down first.

Controller 102 is connected to receiver 104, configured to operate as described herein, to process the signals received from receiver 104. The receiver can operate in any suitable frequency range, including but not limited to the 300 MHz range, the 8 to 12 GHz range, the 18 to 27 GHz range, or the 27 to 40 GHz range. Preferably, the receiver 104 can operate in a low-power mode. Further, in various embodiments, the receiver 104 and controller 102 can operate together to receive transmissions from a transmitter apparatus as described herein; these transmissions can include codes that cause the alert apparatus 100 to activate or perform particular functions.

Receiver 104 is connected to antenna 106. Antenna 106 can be physically implemented as an omnidirectional antenna, and can be implemented as a patterned conductor on the printed circuit board.

In various embodiments, controller 102 is also connected to a health light emitting diode (LED) 108, which can signal whether or not the alert apparatus 100 is operating correctly. The "health monitor" LED 108 may be mounted to the back side of the embedded printed circuit board (seen as the rectangular green shape inside the outline of the receiver) and can be made to pulse continuously so that the battery charge and operational status could be instantly determined by law enforcement, service personnel or the vehicle owner. The health LED 108 can be, for example a bi-color, slow flash LED that flashes green when the alert apparatus 100 is working correctly, and flashes red when it is not. The health LED 108 is preferably visible at least to the driver of the vehicle.

The health LED 108 can also indicate data other than the status of the apparatus 100, such as indicating vehicle status as described below. For example, the health LED 108 can flash red to indicate that a vehicle inspection or registration is expired.

Controller 102 can also be connected to a power management unit 110, which itself can be connected to solar cells 112 and rechargeable battery 114. The power management unit 110 powers the components of the alert apparatus and in some embodiments can output multiple voltages. The power management unit can also manage the charging of batteries from solar cells.

Controller 102 can also be connected to a flasher array 116, which may be formed with one or more LED indicators of like or different colors. The flasher array 116 can be used to visually alert a driver or other person as described below. The flasher array can include low-power, very bright LEDs, in any colors, including strobe LEDs. In some embodiments, these are red and yellow LEDs, but other colors can be used, including high-intensity white LEDs. The LEDs, in some embodiments, are individually controlled by controller 102 according to received transmissions or internal programming.

Controller 102 can also be connected to a speaker 118. Speaker 118 can be used to audibly alert a driver as described below. In some embodiments, the speaker 118 is optimized for voice, such as in the 100-1000 Hz frequency range.

Controller 120 can also communicate with a data port 120 for external programming, data exchange, and other purposes, including data logging. The data port can be used by an external system to query a receiver as to its operational status, software version, or for other data, including queries of and updates to information related to vehicle status as described herein.

The size of the alert apparatus 100 can be constrained such that it is unobtrusive when not activated and its geometry may be such that it conforms in shape to that of a state-issued vehicle sticker, such as a registration or inspection sticker, so that it may share the windshield area with the sticker.

In some embodiments, the alert apparatus 100 is packaged in a translucent, semi-flexible plastic to facilitate mounting, removal, and visibility of the visual alarm. Other constructions are also understood where the device may be in a hard plastic shell or module.

According to various embodiments, the alert apparatus 100 receives and responds to data that can be in the form of a coded signal or other wireless signals emitted by the transmitter apparatus, which can be range limited so as to not affect or activate receivers not in the immediate area of the emergency or alert situation. Multiple modes are anticipated, the simplest being a selection of audible, visual or both alerts. The audible signal may deliver any number of pre-recorded messages stored in the alert apparatus, such as but not limited to such examples as "Please pull over, an emergency vehicle is approaching", "Please pull over to the side of the road and await instructions", and "Warning, danger ahead, proceed cautiously." In some embodiments, pre-recorded messages or tones are stored in the alert apparatus 100 and can be referenced by the coded signal. In other embodiments, no pre-recorded messages are stored in the alert apparatus 100, and the alert apparatus only makes audible alerts based on the received coded signal.

The coded signal can include multiple parts, depending on the required response of the alert apparatus. For example, the coded signal can include a first part that is a flasher array pattern sequence that defines how the visual indicator should be activated, such as a binary code to allow basic flashing, irregular flashing, sound following flash, rotational and other patterns. The coded signal can include a second part that is an encoded audio signal, such as an MP3 encoded sound. In cases where it is useful to limit the transmission length, the coded signal can be limited to, for example, 10 seconds maximum length at 44.1 kHz sampling rate. The coded signal can be encrypted to prevent nuisance attacks, subrogation of the signal, or jamming, and can use a rolling code.

The received data can include commands to query vehicle status as described herein and to selectively activate based on the vehicle status, and can indicate the vehicle status to be queried. The received data can include commands to update vehicle status in the alert apparatus. For example, a customs official may update vehicle status data in the alert apparatus to indicate the time or date that the vehicle was inspected at customs.

The audible signal may also include a voice transmission from the transmitter apparatus and any number of tones and sounds intended to alert the driver, and can include pre-recorded messages broadcast from the transmitter apparatus described herein. Various embodiments can include sequential and combination alerts.

The visual signal of various embodiments includes visual indicators such as flasher array 116. These can be flashing lights, such as LEDs that may be flashed in patterns and at various frequencies depending on the alert code received. Other colors or technologies for the visual alert can also be used, including an electroluminescent panel, incandescent lamps, high-intensity strobe LEDs, and others. The visual indicator, in various embodiments, is visible when activated from outside the vehicle, and is preferably visible at a distance such as 20 yards, 100 yards, or further.

In some embodiments, the alert apparatus is powered by internal rechargeable batteries 114 that are replenished by solar cells 112 mounted to the device surface that faces the outside of the vehicle through the window. The construction is such that the vehicle owner has no need to maintain the device, which can be serviced and replaced during yearly vehicle inspection authorities and/or law enforcement agencies. In other cases, the rechargeable batteries 114 can be replaced with other power sources, such as a fuel cell, and a sufficiently long-life pour source could allow the solar cells 112 to be omitted.

Figure 2A:
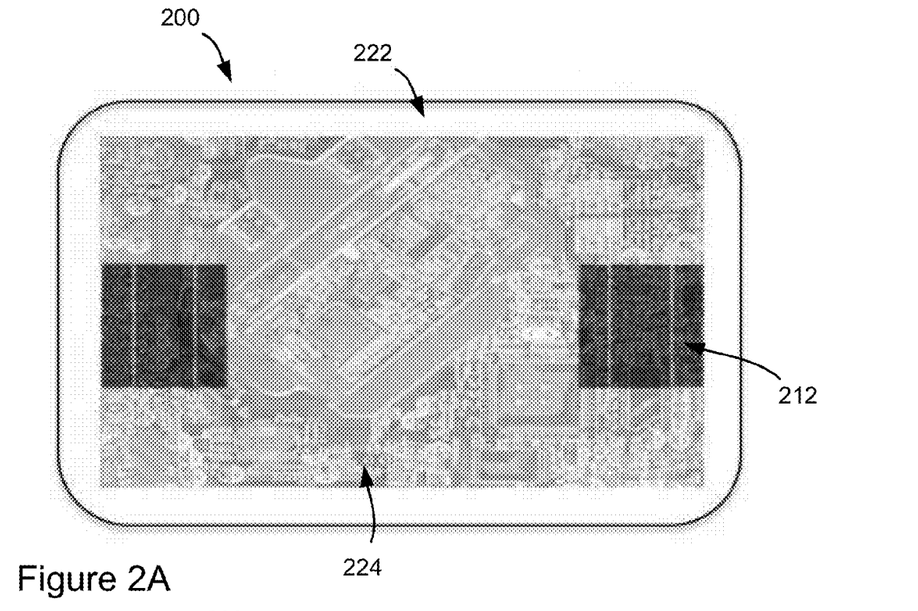
FIGS. 2A-2C illustrate an implementation of an alert apparatus in accordance with disclosed embodiments.
Figure 2B:
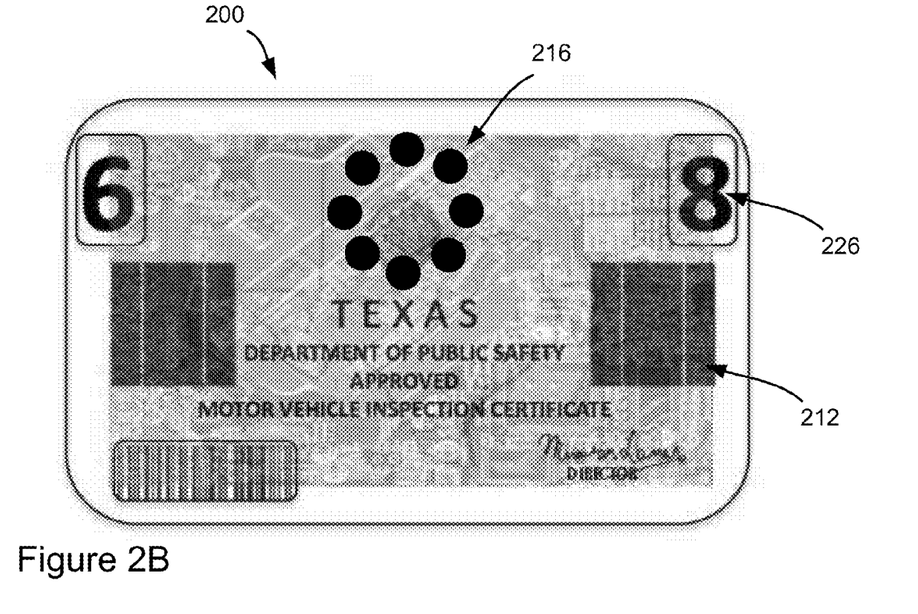
Figure 2C:
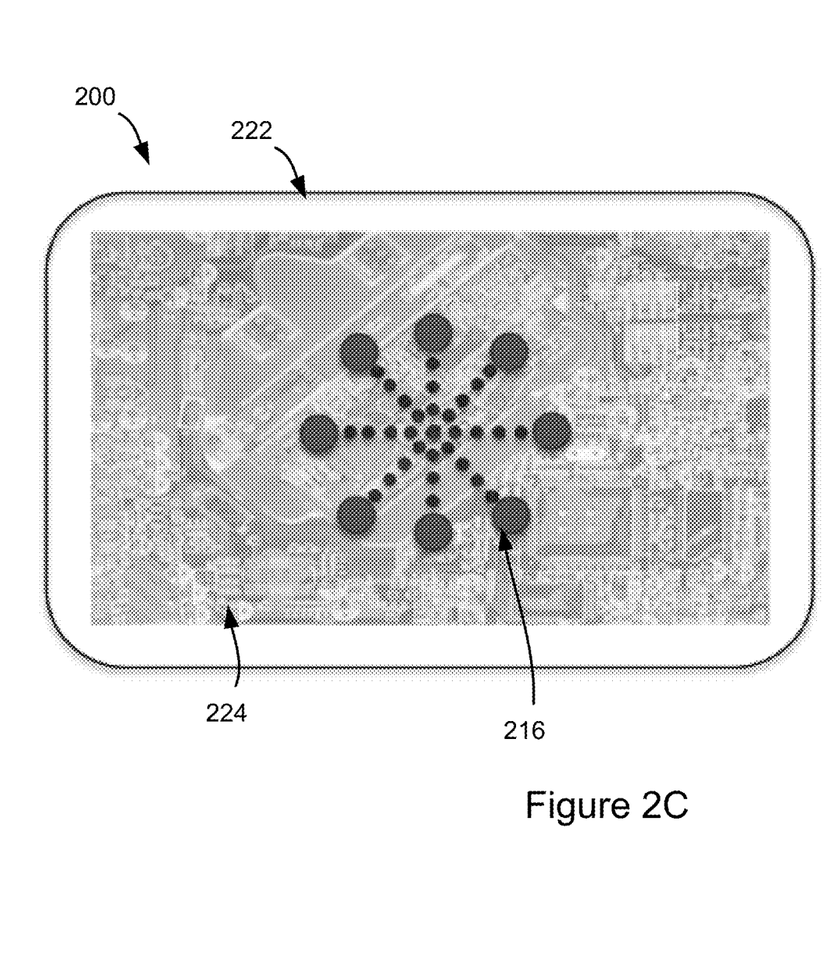

FIGS. 2A-2C illustrate an implementation of an alert apparatus in accordance with disclosed embodiments. FIG. 2A illustrates a front-side view of an assembled alert apparatus 200, including a transparent package 222. In accordance with disclosed embodiments, the front side can be attached to the interior of a vehicle windshield, so that solar cells 212 are exposed to light through the windshield. In this example, PCB 224 is visible through the package 222.

FIG. 2B illustrates a front-side view of an assembled alert apparatus 200, similar to that of FIG. 2A, with a state inspection sticker attached, including the various state-approved indicia 226. According to various embodiments, the sticker is substantially transparent, and at least allows the solar cells 212 to be exposed to light. Illustrated in this figure is a flasher array 216 visible to the persons outside the vehicle, through the transparent package 222 or mounted on the surface of such a package. Of course, the flasher array 216 could be differently located or laid out, such as surrounding the border of the alert apparatus 200.

FIG. 2C illustrates a rear-side view of an assembled alert apparatus 200, including a transparent package 222. PCB 224 is visible through the package 222. Illustrated in this figure is a flasher array 216 is visible to the driver, through the transparent package 222 or mounted on the surface of such a package.

These figures illustrate various possible configurations of the alert apparatus, such as shown with a sample state inspection sticker. The sticker can be coated on both sides with adhesive. One side of the sticker can then be affixed to the receiver and the other side to the windshield. The sticker is preferably substantially transparent so that the solar cells 112 (dark squares) on the front of the receiver package are not obscured. The backside of some embodiments of the receiver is also illustrated, representing the side exposed into the interior of the vehicle. The star-shaped pattern is a set of holes to allow the sounds produced by the audible alert transducer to be heard. The ring of circles represents the LED visual signal generators, although other patterns of both the LEDs and sound holes can be used.

A corresponding transmitter apparatus according to various embodiments is capable of communicating with the alert apparatus, and can be used by law enforcement and emergency personnel to alert drivers. Such a transmitter may be configured in a plurality of ways including, but not be limited to a handheld unit, a window mounted unit, a visor mounted unit, or a permanent installation in a vehicle with a remote control panel. In some specific embodiments, the transmitter can be a handheld transmitter similar to a police "radar gun" that directs transmissions to specific targeted vehicles.

As described above, the internal battery of the alert apparatus can be supplemented by a solar-cell charging circuit and so qualify as a "green" device. The distribution and monitoring of such an apparatus can overlay the existing state license renewal process and so be somewhat transparent to the vehicle owner.

The functionality of the unit is computer controlled with a controller such as a microprocessor and this provides an extensive array of possibilities beyond those explicitly disclosed herein. One use is for the immediate and local signaling of a driver, with both sound and light, of the approach of an emergency vehicle including all emergency first responders. This helps to get vehicles safely out of the way as soon as possible and to increase the level of driver awareness during the period when an emergency vehicle is in close proximity. This capability can significantly decrease accidents and reduce response delays. With modern vehicles becoming more sound proof and the range of driver distractions in the vehicle increasing, various embodiments disclosed herein offer a safe and attention-getting approach that co-exists perfectly with vehicle advancements in terms of comfort, entertainment and communicative technologies. Even though many states are moving towards laws that will restrict the use of cell phones by drivers, hands-free devices are the approved alternative. Disclosed embodiments will supersede the driver's use of such a device and garner their attention to the emergency condition.

Another use for the alert apparatus is as a means for law enforcement and other individuals to verify the vehicle status without requiring the vehicle to be stopped. "Vehicle status," as used herein, refers to status of the vehicle registration, the status of the vehicle inspection such as a required state inspection, border/customs inspection, or otherwise, commercial load inspection or weighing status (including time/date of or elapsed time from the last inspection or weighing), or other information. For example, the alert apparatus can be programmed to activate a visual indicator on the front (outside-the-vehicle) side in response to receiving the transmission as described herein. For example, the alert apparatus can be programmed with the dates of a valid registration or inspection of the vehicle, and can include a clock as part of the controller 120, and can only activate the flasher array when the transmission is received and the registration or inspection is within the valid date range, or conversely when the transmission is received and the registration or inspection is outside the valid date range. The alert apparatus can be programmed to flash a coded signal that indicates the vehicle status, for example such information as the month of the inspection or registration expiration, the date, time, or time elapsed since a commercial load was weighed or inspected, or other information.

As one non-limiting example, a law enforcement officer checking vehicle registrations can use a transmitter as described herein to send a transmission to a vehicle having an alert apparatus as described herein. When the alert apparatus receives the transmission, it can verify that the current date is within a valid date range for the vehicle inspection. If it is, then the alert apparatus can activate the external flasher array, which may be colored LEDs, white LEDs, or otherwise as described herein, and can be activated to be solidly lit, flash in a pattern or as a strobe, or otherwise. The law enforcement officer can then see the active external flasher array and immediately know that the current inspection is valid. On the contrary, if the flasher array is not activated, the law enforcement officer will know that further investigation is needed, such as by stopping the vehicle and checking the inspection dates. Using a system as described herein, the law enforcement officer can verify the inspection status of many vehicles without slowing, stopping, or inconveniencing them, and can do so at a much greater distance then attempting to simply read date indicators on a sticker. In some embodiments, if the alert apparatus determines that the registration, inspection, or other information is invalid, it can be programmed to activate an audible or visual alert to the driver. In some embodiments, the alert apparatus can audibly or visually signal for the driver to pull over the vehicle, either automatically or in response to a subsequent transmission from the transmitter.

According to various embodiments, the alert apparatus can be implemented as a wireless receive-only device that receives signals indicating visible alert sequences (color or dynamic patterns) and sound (tones and voice). The signal received can be coded. Battery and solar cells can power the alert apparatus so that no user interface or maintenance is required.

Figure 3:
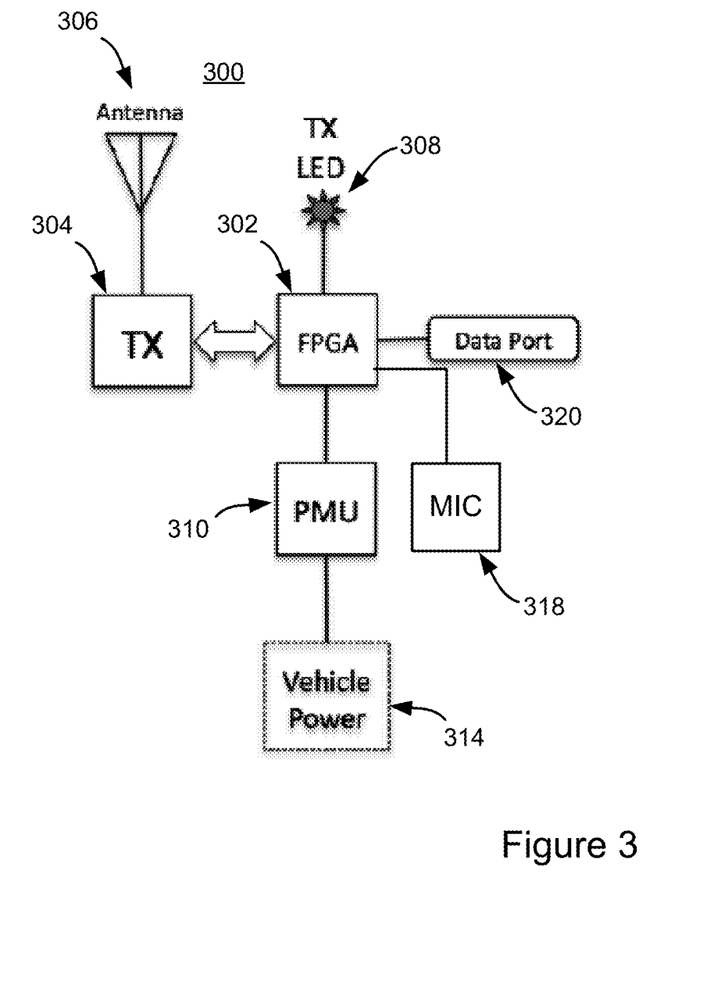
FIG. 3 depicts a functional block diagram of transmitter apparatus in accordance with disclosed embodiments.

FIG. 3 depicts a functional block diagram of transmitter apparatus 300 in accordance with disclosed embodiments that acts to transmit wireless signals to alert a driver as disclosed herein.

The operations of transmitter apparatus 300 are controlled by a controller 102. Controller 102 includes an accessible memory, either integral or separate but connected to be read from and written to by the controller 102. The controller can, in some embodiments, be implemented as a field programmable gate array (FPGA) or otherwise as will be understood by those of skill in the art. The controller 102 can preferably operate in a low-power mode, and can cause the transmitter apparatus to perform such functions as described herein, including encoding signals for transmission, outputting a visual alert, receiving audio input for transmission, transmitting and receiving data via a data port, and others. The controller 102 can interface with the power management unit described below, and can monitor its own health.

Controller 102 is connected to transmitter 304, configured to operate as described herein, to process and transmit signals by transmitter 304. The transmitter 304 can operate in any suitable frequency range, including but not limited to the 300 MHz range, the 8 to 12 GHz range, the 18 to 27 GHz range, or the 27 to 40 GHz range. Preferably, the transmitter 304 can operate in a low-power mode. Further, in various embodiments, the transmitter 304 and controller 302 can operate together to send transmissions to a receiver apparatus as described herein; these transmissions can include codes that cause the alert apparatus 100 to activate or perform particular functions.

Transmitter 304 is connected to antenna 306. Antenna 306 is preferably a directional antenna for directed transmissions. Antenna 306, in various embodiments, is designed for a restricted forward and side lobe pattern to reduce the chance for activating receivers that are not within the situation area. A typical transmission range would be approximately 1000 feet in the "forward" direction from the placement of the transmitter apparatus (whether in a fixed location or on a moving vehicle), with a reduced range in the side and backwards directions. The transmission range can be adjusted as needed.

In various embodiments, controller 302 is also connected to a transmission LED 308, which can activate to indicate when the transmitter apparatus 300 is actively transmitting. The transmission LED 308 can also be controlled to indicate the status of the transmitter apparatus 308 between transmissions.

Controller 302 can also be connected to a power management unit 310, which itself can be connected to a power source 314, such as a vehicle power supply, power mains, or battery power. The power management unit 310 powers the components of the transmitter apparatus and in some embodiments can output multiple voltages.

Controller 302 can also be connected to an audio input 318, such as a microphone. Audio input 318 can be used to record or otherwise input audio data for transmission as described herein. In some embodiments, the audio input 318 is optimized for voice, such as in the 100-1000 Hz frequency range.

Controller 320 can also communicate with a data port 320 for external programming, data exchange, and other purposes, including data logging.

Transmitter apparatus 300 can transmit audible signals as described herein. The audible signal can include a voice transmission and any number of tones and sounds intended to alert the driver, and can include pre-recorded messages stored in the transmitter apparatus 300.

Other elements and components can be included in the transmitter apparatus. It is understood that a transmitter apparatus in accordance with disclosed embodiments can also have appropriate controls such that various alert modes can be activated. It may also have an on/off switch, battery and power monitors, and other functions and components.

According to various embodiments, a transmitter apparatus can be adapted for placement at the advisory site to transmit to the alert apparatus.

Disclosed embodiments include a micro computer controlled system including a transmitter apparatus in emergency or governmental vehicles, and a self-contained receiver within individual automobiles, attached to the license renewal sticker, currently required to be attached to the windshield of all vehicles in some states, inspection sticker, or otherwise.

Again, since the various disclosed systems are microcomputer controlled, roadside transmitters can activate the receiver to provide warnings of construction, school and other traffic zones where increased driver attention is warranted. Similarly, law enforcement transmitters will have the ability to project the officer's voice into the vehicle to provide instructions to the occupants during traffic stops thus increasing the level of safety of the officers involved. Finally, "Amber," "Silver" and other public safety alerts may also be accommodated. This latter capability is superior to roadway signs and radio announcements because of the targeted nature of the system.

According to various embodiments, the disclosed transmitter apparatus can operate in many configurations and modes, such as automatically transmitting when an emergency vehicle siren is activated, transmitting voice input to be sounded in the approaching vehicles by the alert apparatus, being integrated with a megaphone or radio microphone for voice transmissions. In various embodiments, the transmitter apparatus can be handheld or mounted on a tripod, sign, or other structure in a construction zone, school zone, or such road area. It can be configured for continuous, periodic, or occasional transmissions and can be remotely activated. Various embodiments include a narrow antenna main lobe with a limited range to constrain false alarms. In various embodiments, the transmitter is coded and can be updated via Internet or flash drive.

Figure 4:
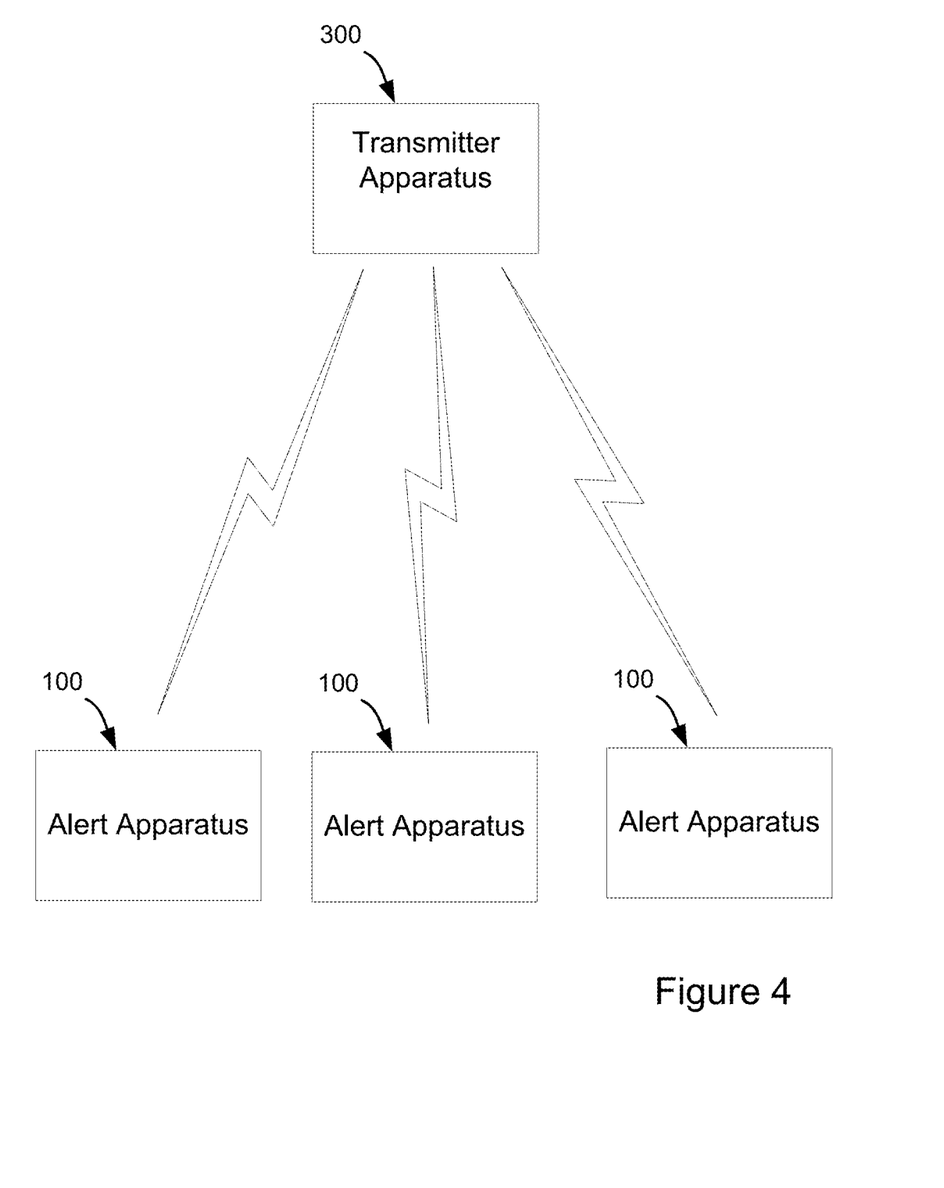
FIG. 4 depicts a simplified block diagram of a system in accordance with disclosed embodiments.

FIG. 4 depicts a simplified block diagram of a system in accordance with disclosed embodiments. In this system, a transmitter apparatus 300 broadcasts warning, query, or other information or data as described herein. The transmitter apparatus 300 can be stationary, such as at a construction site, the scene of a roadway accident or other event, from a fixed hazard, from a handheld device, or from another location about which drivers may be alerted. Such a stationary location can be permanent or temporary. Alternately, the transmitter apparatus 300 can also be in motion, such as attached to an emergency vehicle, utility vehicle, or otherwise.

The information broadcast by the transmitter apparatus 300 is received by one or more alert apparatuses 100, as described herein. The alert apparatus then will activate visual and/or audible alerts, as described herein. The content and type of alert can be determined by the received information, or can be determined by the internal configuration of the alert apparatus 100.

Various embodiments include a traffic information warning system for conveying first and second messages regarding a traffic situation from a transmitter apparatus at a traffic advisory site to an alert apparatus. The various circuitry described herein can be implemented as dedicated circuitry as known to those of skill in the art, and can be implemented using the controllers described herein. Various embodiments also contemplate that the vehicle status can include information related to the driver or registered owner of a vehicle. For example, if the vehicle or registered owner of the vehicle were a wanted criminal or the subject of an "Amber" or "Silver" alert, roadway transmitters can be used to activate the alert apparatus so that, for example, it begins constantly flashing the visual indicator to draw attention of law enforcement or other drivers.

U.S. Pat. Nos. 6,236,336, 5,612,685, 5,594,432, and 5,497,148 are hereby incorporated by reference.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of apparatus 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. An alert apparatus, comprising:
   a controller;
   a wireless receiver connected to the controller and configured to receive data from a transmitter;
   a packaging containing the controller and receiver, wherein the packaging is attached to a state-issued vehicle sticker; and
   a visual indicator connected to be controlled by the controller and visible from outside of a vehicle on which the alert apparatus is mounted, wherein the visual indicator is controllably activated by the controller based on the received data, and wherein the alert apparatus is mounted on a windshield of the vehicle.

2. The alert apparatus of claim 1, wherein the visual indicator is controllably activated by the controller based both on the received data and on a vehicle status.

3. The alert apparatus of claim 2, wherein the vehicle status is one of status of a vehicle registration, status of a vehicle inspection, a commercial load inspection status, or a commercial load weighing status.

4. The alert apparatus of claim 2, wherein the data includes a command to query the vehicle status.

5. The alert apparatus of claim 2, wherein the vehicle status is a vehicle registration and the visual indicator is activated if the vehicle registration is expired.

6. The alert apparatus of claim 2, wherein the vehicle status is a vehicle registration and the visual indicator is activated if the vehicle registration is valid.

7. The alert apparatus of claim 1, wherein the visual indicator, when activated, is visible at a distance of at least 20 yards.

8. The alert apparatus of claim 1, wherein the visual indicator is a plurality of individually-controllable light-emitting diodes.

9. The alert apparatus of claim 1, further comprising at least one solar cell that is visible through a transparent portion of the packaging.

10. The alert apparatus of claim 1, further comprising a rechargeable battery connected to power the controller and to be charged by at least one solar cell.

11. The alert apparatus of claim 1, wherein the controller is configured to update a vehicle status in response to the received data.

12. The alert apparatus of claim 1, further comprising at least one solar cell that is visible through a transparent portion of the packaging, and wherein the alert apparatus is configured to be mounted on a window of a vehicle such that the solar cell is exposed to light through the window.

13. The alert apparatus of claim 1, wherein the visual indicator is at least one strobe light-emitting diode.

14. The alert apparatus of claim 1, wherein the visual indicator is also visible to a driver of the vehicle.

15. An alert system, comprising:
a driver alert apparatus mounted on a vehicle and having a controller, a wireless receiver connected to the controller, a packaging containing the controller and receiver, and a visual indicator connected to be controlled by the controller, wherein the driver alert apparatus is affixed to a state-issued vehicle sticker and mounted on a windshield of the vehicle; and
a transmitter apparatus configured to transmit data to the driver alert apparatus to query a vehicle status of the vehicle,
wherein the wireless received is configured to receive the data, and the visual indicator is controllably activated by the controller based on the received data and the vehicle status.

16. The alert system of claim 15, wherein the transmitter apparatus is a handheld device.

17. The alert system of claim 15, wherein the transmitter apparatus is stationary.

18. The alert system of claim 15, wherein the vehicle status is one of status of a vehicle registration, status of a vehicle inspection, a commercial load inspection status, or a commercial load weighing status.

* * * * *